F. M. BERBERICH.
APPARATUS FOR MILKING COWS.
APPLICATION FILED APR. 6, 1908.
948,440.
Patented Feb. 8, 1910.
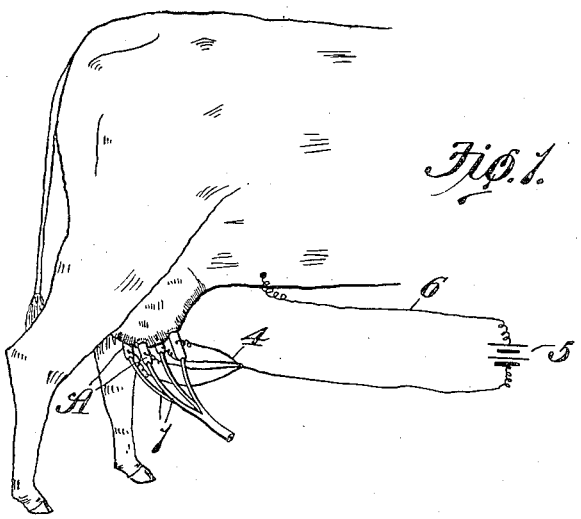
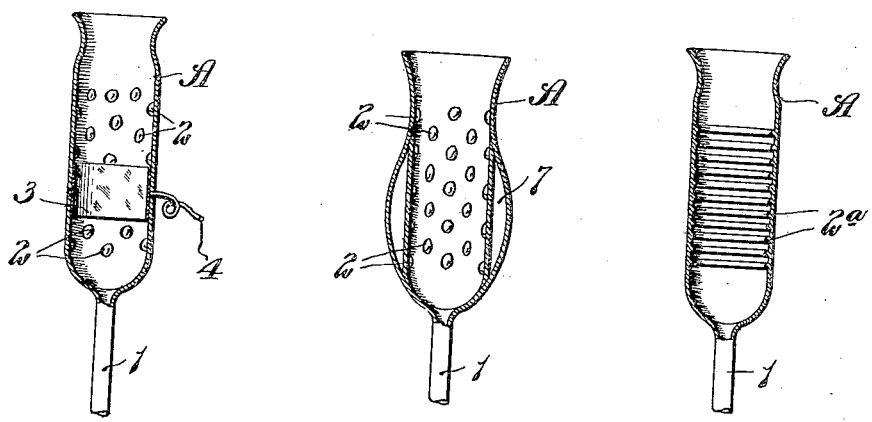
Witnesses:
George Ladson
Nell L. Church
Inventor,
Franz M. Berberich.
By Bakewell Cornwall Attys.

UNITED STATES PATENT OFFICE.

FRANZ M. BERBERICH, OF ST. LOUIS, MISSOURI.

APPARATUS FOR MILKING COWS.

948,440.

Specification of Letters Patent. Patented Feb. 8, 1910.

Application filed April 6, 1908. Serial No. 425,417.

*To all whom it may concern:*

Be it known that I, FRANZ M. BERBERICH, a citizen of the German Empire, residing at St. Louis, Missouri, have invented a certain new and useful Improvement in Apparatus for Milking Cows, of which the following is a full, clear, and exact description, such as will enable others skilled in the art to which it appertains to make and use the same, reference being had to the accompanying drawings, forming part of this specification, in which—

Figure 1 is a view illustrating my improved apparatus applied to a cow; Fig. 2 is a vertical sectional view of one of the teat cups shown in Fig. 1; Fig. 3 is a vertical sectional view of a teat cup of slightly different construction; and Fig. 4 is a vertical sectional view of still another form of teat cup.

This invention relates to machines for milking cows. It is well-known that the sucking of a calf is the most perfect manner of milking and produces a greater yield of milk than hand milking. This is due partly to the fact that the electricity in the cald's body is transmitted to the cow and thus electrifies the cow so that the milk flows freely, and partly to the fact that the action of the rough tongue of the calf on the teats on the cow's udder massages same and has a reflex action on the muscles of the cow which causes the milk to continue to flow freely.

The object of my invention is to produce a milking apparatus that has practically the same effect on a cow as the sucking of a calf, and to this end I have devised an apparatus that comprises means for subjecting a cow to a slight electric shock and teat cups provided on their inner faces with corrugations or protuberances that press upon the teat of the cow and thus produce a reflex action on the muscles of the cow.

Referring to the drawings, A designates teat cups that are preferably made of rubber and which are connected to tubes 1 that lead to a pumping apparatus, not shown. The inside faces of the teat cups are provided with protuberances 2, as shown in Fig. 2, and in the preferred form of my invention said cups are provided on their inner faces with a metal contact 3 which can consist of a ring or lining of metal, such for example, as tin-foil. A wire 4 which leads from a battery 5 or other suitable means for generating electricity, is connected to the metal contact 3 on the inside of the teat cup and the other wire 6, which leads from said battery, contacts with some part of the cow's body so as to complete the circuit, and thus cause an electric current to pass through the body of the cow so as to cause the milk to flow freely. The protuberances or roughened surface on the interior of the teat cup press on the teat which said cup surrounds when a vacuum is created in the tube 1 and thus produce a reflex action on the muscles of the cow which cause the milk to continue to flow freely.

If desired, the teat cup can be provided with double walls which form an air chamber 7, as shown in Fig. 3, which tends to force the inner wall of the cup tightly against the teat which it surrounds. Instead of providing the inner face of the cup with protuberances or projections, as shown in Figs. 2 and 3, the inner face of the cup can be provided with corrugations or ribs $2^a$, as shown in Fig. 4. In fact, it is immaterial, so far as my broad idea is concerned, how the inner face of the teat cup is formed so long as it is roughened. Furthermore, it is immaterial, so far as my broad idea is concerned, at what points the conducting wires 4 and 6 are connected to the cow, and while I prefer to have one wire connected to a contact that engages the teat of the cow, I do not wish to be understood as limiting my invention to such a construction as the contacts can be arranged in engagement with other parts of the cow's body.

I have herein stated that the tubes 1 lead to a pumping apparatus which creates a vacuum in said tubes but I wish to have it clearly understood that it is immaterial, so far as my broad idea is concerned, what kind of milking machine is used for the same results can be obtained with a pressure milking machine or in fact any type of milking machine. The particular kind of electricity that is used for electrifying the cow is also immaterial for equally good results can be obtained from dynamic, galvanic, faradic, or thermo-electricity.

Having thus described my invention, what I claim as new and desire to secure by Letters Patent is:

1. In an apparatus of the class described, a teat cup, a metal contact arranged on the inner face thereof, an electric conducting wire connected to said contact, and an electric current generator connected to said wire.

2. An apparatus for milking cows, comprising cups that are adapted to embrace the teats on a cow's udder, a metal contact arranged on the inner face of each cup, and an electric conducting wire connected to each contact and also contacting with some other part of the cow's body for causing a current of electricity to flow through the body of the cow; substantially as described.

3. An apparatus for milking cows, comprising teat cups provided on their inner faces with corrugations or projections, a metal contact arranged inside each cup, a device for generating electricity, a wire leading from said device and connected to the contacts inside of said cups, and a wire leading from said device and contacting with some part of the cow's body; substantially as described.

4. A teat cup consisting of an inner wall formed of pliable material and provided on its inner surface with projections, and an outer wall of pliable material surrounding a portion of said inner wall and connected thereto in such a manner that a closed airtight chamber is formed between said walls; substantially as described.

5. In an apparatus of the class described, a teat cup, the inner face of which is corrugated, a metal contact arranged on said corrugated inner face, and which contact is adapted to be connected to an electric conducting wire.

6. In an apparatus of the class described, a teat cup, the interior of which is corrugated, an electrode on said corrugated inner face, a conducting wire leading to said electrode, and a suction tube leading from the lower end of said teat cup.

7. In an apparatus of the class described, a teat cup, a suction tube leading from the lower end thereof, and means whereby a current of electricity is caused to flow through the cow's body during the time suction is produced within the teat cup through the suction tube.

In testimony whereof I hereunto affix my signature in the presence of two witnesses, this second day of April 1908.

FRANZ M. BERBERICH.

Witnesses:
WELLS L. CHURCH,
GEORGE BAKEWELL.